United States Patent
Momcilovich et al.

(10) Patent No.: US 9,325,181 B2
(45) Date of Patent: Apr. 26, 2016

(54) BATTERY OVERCHARGE MONITORING SYSTEM AND METHOD

(71) Applicant: Ford Global Technologies, LLC, Dearborn, MI (US)

(72) Inventors: Paul Theodore Momcilovich, Tecumseh, MI (US); Allan Roy Gale, Livonia, MI (US); Bruce Carvell Blakemore, Plymouth, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 13/945,437

(22) Filed: Jul. 18, 2013

(65) Prior Publication Data

US 2015/0022150 A1 Jan. 22, 2015

(51) Int. Cl.
*H02J 7/00* (2006.01)
*B60L 11/18* (2006.01)
*B60L 3/00* (2006.01)
*B60L 7/12* (2006.01)
*B60L 11/14* (2006.01)
*B60L 3/12* (2006.01)
*B60L 11/12* (2006.01)

(52) U.S. Cl.
CPC ............ *H02J 7/0029* (2013.01); *B60L 3/0046* (2013.01); *B60L 3/12* (2013.01); *B60L 7/12* (2013.01); *B60L 11/123* (2013.01); *B60L 11/14* (2013.01); *B60L 11/1805* (2013.01); *B60L 11/1809* (2013.01); *B60L 11/1857* (2013.01); *B60L 11/1861* (2013.01); *B60L 11/1864* (2013.01); *H02J 7/0052* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2240/80* (2013.01); *B60L 2250/10* (2013.01); *B60L 2250/16* (2013.01); *B60L 2260/44* (2013.01); *B60L 2260/54* (2013.01); *H02J 7/0031* (2013.01); *H02J 2007/0037* (2013.01); *Y02T 10/6217* (2013.01); *Y02T 10/642* (2013.01); *Y02T 10/7005* (2013.01); *Y02T 10/7044* (2013.01); *Y02T 10/7061* (2013.01); *Y02T 10/7077* (2013.01)

(58) Field of Classification Search
CPC .................... B60L 11/1851; B60L 11/1611
USPC ................................ 320/109, 133, 137
See application file for complete search history.

(56) References Cited

U.S. PATENT DOCUMENTS

| 5,952,813 | A  | * | 9/1999 | Ochiai ........... H02J 7/0011 320/104 |
| 6,992,464 | B2 |   | 1/2006 | Takano et al. |
| 7,476,987 | B2 | * | 1/2009 | Chang .................... 290/55 |

(Continued)

OTHER PUBLICATIONS

Anon; Latest Development in Battery Chargers; Dec. 1977; pp. 14-15; vol. 63, No. 4, Aliens Ltd.

*Primary Examiner* — Paul Dinh
(74) *Attorney, Agent, or Firm* — Carlson, Gaskey & Olds, P.C.

(57) ABSTRACT

An exemplary battery charge monitoring method includes, among other things, calculating expected charge data for a battery using at least a capacity of the battery and a charge rate, and comparing actual charge data to the expected charge data to identify differences between the actual charge data and the expected charge data.

17 Claims, 5 Drawing Sheets

(56) References Cited

U.S. PATENT DOCUMENTS

| | | |
|---|---|---|
| 2004/0257041 A1* | 12/2004 | Nagaoka ................... 320/128 |
| 2005/0099162 A1* | 5/2005 | Ding ......................... 320/141 |
| 2006/0208704 A1 | 9/2006 | Iwane et al. |
| 2008/0084182 A1* | 4/2008 | Oberlin et al. ............. 320/116 |
| 2009/0104510 A1* | 4/2009 | Fulop et al. ................. 429/50 |
| 2009/0243548 A1* | 10/2009 | Hoff ........................... 320/150 |
| 2009/0243549 A1 | 10/2009 | Matsumura et al. |
| 2010/0217466 A1* | 8/2010 | Ichikawa ................ B60K 6/48 701/22 |
| 2010/0244777 A1 | 9/2010 | Toyota |
| 2010/0327818 A1* | 12/2010 | Taniguchi et al. ............ 320/162 |
| 2011/0156660 A1* | 6/2011 | Cheng et al. .................. 320/157 |
| 2011/0193522 A1* | 8/2011 | Uesugi ......................... 320/109 |
| 2011/0298626 A1* | 12/2011 | Fechalos ............. H01M 10/482 340/664 |
| 2012/0130661 A1* | 5/2012 | Hagimori et al. ............... 702/63 |
| 2014/0125281 A1* | 5/2014 | Mitsutani ..................... 320/109 |
| 2014/0225561 A1* | 8/2014 | Hasegawa ............. H01M 10/44 320/108 |
| 2014/0312847 A1* | 10/2014 | Chauhdary ......... B60L 11/1816 320/128 |

* cited by examiner

BATTERY OVERCHARGE MONITORING SYSTEM AND METHOD

TECHNICAL FIELD

This disclosure relates generally to charging a battery and, more particularly, to preventing overcharging of the battery.

BACKGROUND

Electric vehicles and many other devices may rely on a battery to store electrical power.

Generally, electric vehicles differ from conventional motor vehicles because electric vehicles selectively drive the vehicle using one or more battery-powered electric machines. Conventional motor vehicles, by contrast, rely exclusively on the internal combustion engine. Electric vehicles may use electric machines instead of, or in addition to, to the internal combustion engine. Example electric vehicles include hybrid electric vehicles (HEV's), plug in hybrid electric vehicles (PHEV's), and battery electric vehicles (BEV's).

Electric vehicles may be equipped with a battery configured to store electrical power for powering the electric machine. The batteries are charged prior to use, and recharged when the electric power in the battery becomes depleted.

A battery charger is typically used to charge batteries. In some electric vehicles, the electric machine may be used as a generator that is powered by the internal combustion engine in order to generate electrical power to charge the battery. Charging adds power to batteries. It can be difficult to determine when an appropriate amount of power has been added back to the battery during a charge. Adding too much power can cause the battery to become overcharged.

SUMMARY

A battery charge monitoring method according to an exemplary aspect of the present disclosure includes, among other things, calculating expected charge data for a battery using at least a capacity of the battery and a charge rate, and comparing actual charge data to the expected charge data to identify differences between the actual charge data and the expected charge data.

In a further non-limiting embodiment of the foregoing battery charge monitoring method, the method includes ending the charging in response to the comparing.

In a further non-limiting embodiment of any the foregoing battery charge monitoring methods, the expected charge data comprises an expected charge time, and the actual charge data comprises an actual charge time.

In a further non-limiting embodiment of any the foregoing battery charge monitoring methods, the method includes ending the charge in response to the expected charge time exceeding the actual charge time.

In a further non-limiting embodiment of any the foregoing battery charge monitoring methods, the expected charge data and the actual charge data comprise electric charge data, and charging of the battery is terminated in response to an actual amount of electrical charge exceeding an expected amount of electrical charge.

In a further non-limiting embodiment of any the foregoing battery charge monitoring methods, the expected charge data and the actual charge data comprise voltage data, and charging of the battery is terminated in response to an actual voltage exceeding an expected amount of voltage.

In a further non-limiting embodiment of any the foregoing battery charge monitoring methods, the expected charge data and the actual charge data comprise energy data, and charging of the battery is terminated in response to an actual energy to charge the battery exceeding an expected amount of energy required to charge the battery.

In a further non-limiting embodiment of any the foregoing battery charge monitoring methods, the expected charge data comprises a substantially monotonic increase of the voltage such that a change in the voltage during the charging is substantially non-negative, and charging is terminated if the change in the voltage is negative.

In a further non-limiting embodiment of any the foregoing battery charge monitoring methods, the expected charge data comprises a substantially monotonic decreasing battery current such that a change in the battery current during the charging is less than or equal to zero, and charging is terminated if the change in the current is greater than zero.

In a further non-limiting embodiment of any the foregoing battery charge monitoring methods, the capacity of the battery comprises a maximum voltage for cells of the battery.

In a further non-limiting embodiment of any the foregoing battery charge monitoring methods, the capacity of the battery comprises a percentage of a maximum voltage for cells of the battery.

In a further non-limiting embodiment of any the foregoing battery charge monitoring methods, the capacity of the battery comprises an amp-hour capacity for cells of the battery.

In a further non-limiting embodiment of any the foregoing battery charge monitoring methods, the method includes using a battery charge controller for the calculating and the comparing.

In a further non-limiting embodiment of any the foregoing battery charge monitoring methods, the battery is a vehicle battery.

A battery charging system according to an exemplary aspect of the present disclosure includes a battery charger to charge a battery; and a controller configured to selectively end a charge of the battery in response to a comparison of an expected charge amount to an actual charge amount, the expected charge amount calculated using at least a capacity of the battery and a charge rate.

In a further non-limiting embodiment of the forgoing battery charging system, the actual charge amount comprises a measurement of time spent charging the battery with the battery charger.

In a further non-limiting embodiment of any of the forgoing battery charging systems, the controller selectively ends the charge in response to the expected charge amount exceeding the actual charge amount.

In a further non-limiting embodiment of any of the forgoing battery charging systems, the battery is an electric vehicle battery.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
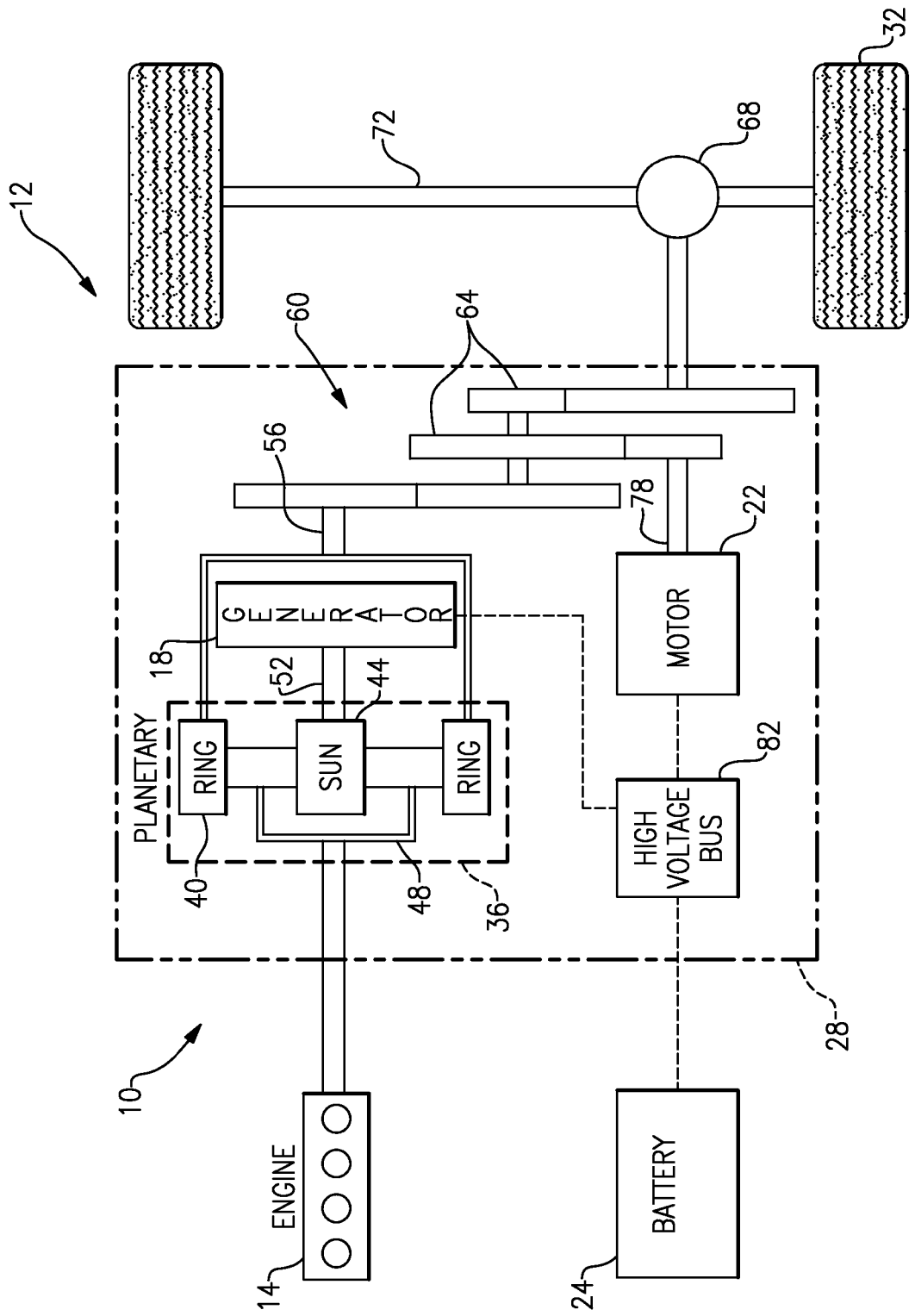
FIG. 1 schematically illustrates an electric vehicle powertrain having a battery.

FIG. 1 schematically illustrates a powertrain 10 for an electric vehicle 12. Although depicted as a hybrid electric vehicle (HEV), it should be understood that the concepts described herein are not limited to HEV's and could extend to other electric vehicles, including but not limited to, plug-in hybrid electric vehicles (PHEV's) and battery electric vehicles (BEV's).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this example, the second drive system is considered an electric drive system 28 of the powertrain 10. The first and second drive systems generate torque to drive one or more sets of vehicle drive wheels 32 of the electric vehicle 12.

The engine 14, which is an internal combustion engine in this example, and the generator 18 may be connected through a power transfer unit 36, such as a planetary gear set. Of course, other types of power transfer units, including other gear sets and transmissions, may be used to connect the engine 14 to the generator 18. In one non-limiting embodiment, the power transfer unit 36 is a planetary gear set that includes a ring gear 40, a sun gear 44, and a carrier assembly 48.

The generator 18 may be driven by engine 14 through the power transfer unit 36 to convert kinetic energy to electrical energy. The generator 18 can alternatively function as a motor to convert electrical energy into kinetic energy, thereby outputting torque to a shaft 52 connected to the power transfer unit 36. Because the generator 18 is operatively connected to the engine 14, the speed of the engine 14 can be controlled by the generator 18.

The ring gear 40 of the power transfer unit 36 may be connected to a shaft 56, which is connected to vehicle drive wheels 32 through a second power transfer unit 60. The second power transfer unit 60 may include a gear set having a plurality of gears 64. Other power transfer units may also be suitable. The gears 64 transfer torque from the engine 14 to a differential 68 to ultimately provide traction to the vehicle drive wheels 32. The differential 68 may include a plurality of gears that enable the transfer of torque to the vehicle drive wheels 32. The second power transfer unit 60 is mechanically coupled to an axle 72 through the differential 68 to distribute torque to the vehicle drive wheels 32.

The motor 22 (i.e., a second electric machine) can also be employed to drive the vehicle drive wheels 32 by outputting torque to a shaft 78 that is also connected to the second power transfer unit 60. In one embodiment, the motor 22 and the generator 18 cooperate as part of a regenerative braking system in which both the motor 22 and the generator 18 can be employed as motors to output torque. For example, the motor 22 and the generator 18 can each output electrical power to a high voltage bus 82 and the battery 24. The battery 24 may be a high voltage battery that is capable of outputting electrical power to operate the motor 22 and the generator 18. Other types of energy storage devices and/or output devices can also be used with the electric vehicle 12.

Figure 2:
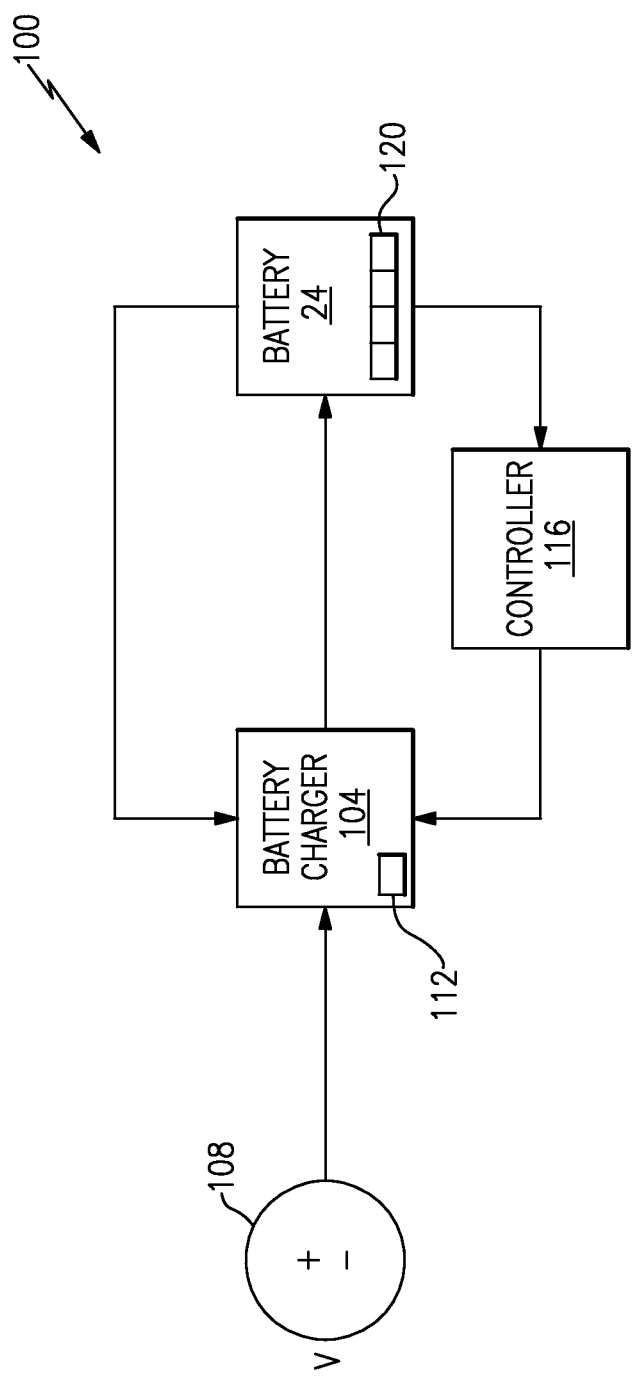
FIG. 2 schematically illustrates an example battery charging system for charging the battery of FIG. 1.

Referring now to FIG. 2 with continuing reference to FIG. 1, a battery charging system 100 is used to recharge the battery 24 when charge in the battery 24 has been depleted due to operating the vehicle 12. The battery charging system 100 could also be used to initially charge the battery 24 prior to use or prior to installation within the vehicle 12. The battery 24 may stay in the vehicle 12 during a charge or may be removed from the vehicle.

The battery charging system 100 includes a battery charger 104 that selectively couples the battery 24 to a power source 108 to charge the battery 24 to a desired level. The battery charger 104 includes a processor 112 configured to control the selective coupling. The battery charging system 100 further includes a controller 116 configured to control the selective coupling to prevent overcharging the battery 24. In this example, the processor 112 is part of the battery charger 104. The controller 116 is a structure separate and distinct from the battery charger 104.

When the battery charger 104 is coupled to the battery 24, the battery charger 104 communicates charge to the battery 24 from the power source 108 to charge the battery 24 and specifically cells 120 of the battery 24. Decoupling the battery charger 104 from the battery 24 ends the charge.

The battery charger 104 monitors the battery 24 to determine when to stop charging the battery 24. Specifically, when the processor 112 determines that the battery 24 has received enough A-hr (Coulomb charge) and or kW-hr, the processor 112 stops the charge. The processor 112 selectively couples the battery charger 104 to the battery 24 to control charging of the battery 24. The duration of the charge changes based on, an amount of charge required, a capacity of the battery 24, a rate of charge, etc. In some examples, the processor 112 may incorrectly determine when to discontinue charging, which can result in undesirably charging the battery 24 beyond a desired level.

In this example, the controller 116 is used to inhibit charging the battery 24 beyond a desired level. The controller 116 monitors the charging of the battery 24 and compares expected charge data to actual charge data. The controller 116 may discontinue the charging, or take some other action in response to the comparison. For example, the controller 116 may discontinue the charging if the charging lasts longer than expected. Differences between expected charge data and actual charge data may, for example, indicate that the battery 24 requires repair or replacement.

Notably, in the example system 100, both the controller 116 and the battery charger 104 (via the processor 112) are calculating the charge status of the battery 24. In some examples, the controller 116 prevents the battery 24 from becoming overcharged.

The example controller 116 is shown separate from the battery 24 and the battery charger 104. The controller 116 may be positioned elsewhere within the system, such as attached to the battery 24 or within the battery charger 104. The processor 112 could also be positioned outside the battery charger 104.

Figure 3:
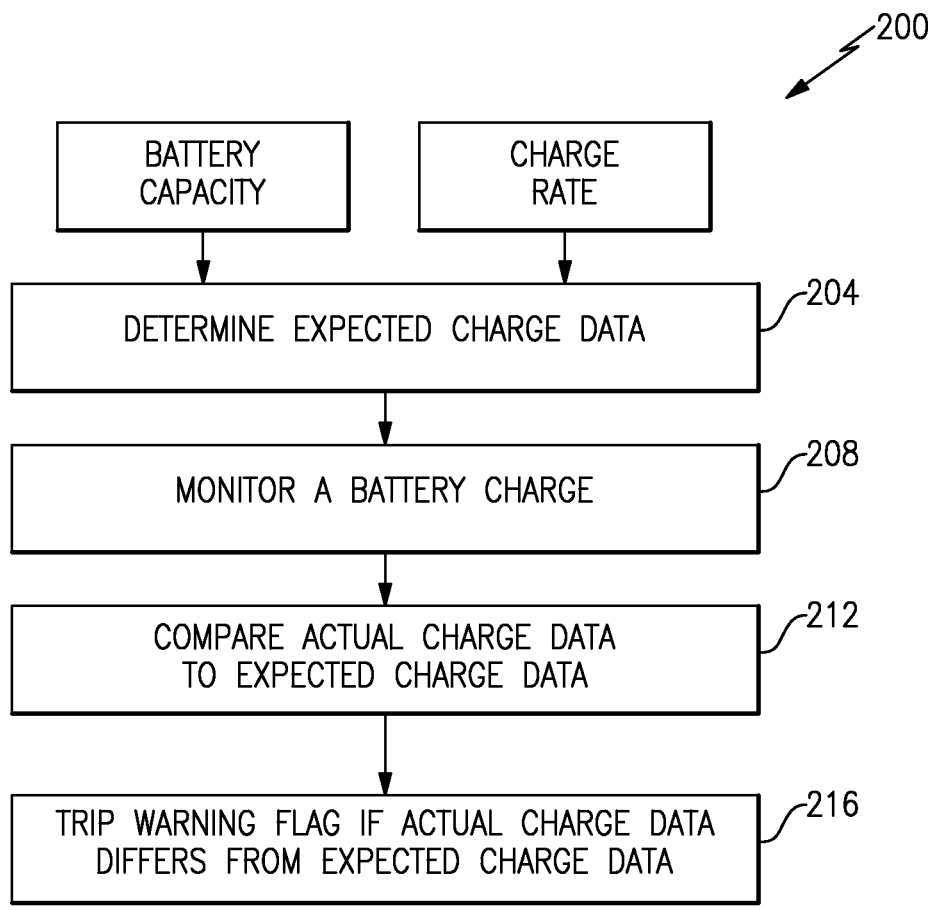
FIG. 3 shows an example battery charge monitoring method.

Referring now to FIG. 3 with reference to FIG. 2, an example battery charge monitoring method 200 identifies discrepancies between actual charge data and expected charge data. The method 200 is utilized by the controller 116 to determine when to charge, and when not to charge, the battery 24.

Expected charge data may include an expected time to complete the charge, the expected A-hrs carried by the battery 24 after completing the charge, etc. An example discrepancy may be the actual charge time lasting longer than the expected charge time.

In the method 200, a step 204 utilizes a battery capacity and a charge rate to determine expected charge data for the battery 24.

The battery capacity, in this example, is a maximum total amount energy, A-hrs, or both that the battery 24 is capable of storing. The battery capacity may be based on design specifications for the vehicle 12 (FIG. 1). In another example, the capacity of the battery 24 may be a desired percentage of the maximum total amount of battery capacity that the battery 24 is capable of storing. For example, it may be desirable to charge the battery 24 to ninety percent of its total battery capacity. In such an example, the battery capacity for the method 200 would be ninety percent of the total capacity of the battery 24.

The charge rate is determined from the battery charger 104 and may utilize information from the battery 24. The charge rate represents the rate at which the battery charger 104 delivers Amperes (A) or kW (kilowatts) from the power source 108 to the battery 24.

After calculating the expected charge data at the step 204, the method 200 begins monitoring a battery charge at a step 208. This step monitors the A-hr and/or kW-hr charge rate to the battery 24 from the battery charger 104. The monitoring may begin prior to, or at the same time as, the calculating step 204 in other examples.

At a step 212, the controller 116 compares the actual charge data to the expected charge data from the step 204. If the actual charge data is different than the expected charge data, the controller 116 responds, such as by tripping a warning flag at the step 216. The controller 116 may also decouple the battery charger 104 from the battery 24 at the step 216.

In one more specific example, the controller 116 compares the actual charge time to an expected charge time. If the actual charge time exceeds the expected charge time, the controller 116 initiates a flag that notifies a technician. This difference may indicate a failure within the system 100 or the vehicle 12. An example failure may include degradation of the battery 24. Severe degradation may require battery replacement.

Figure 4:
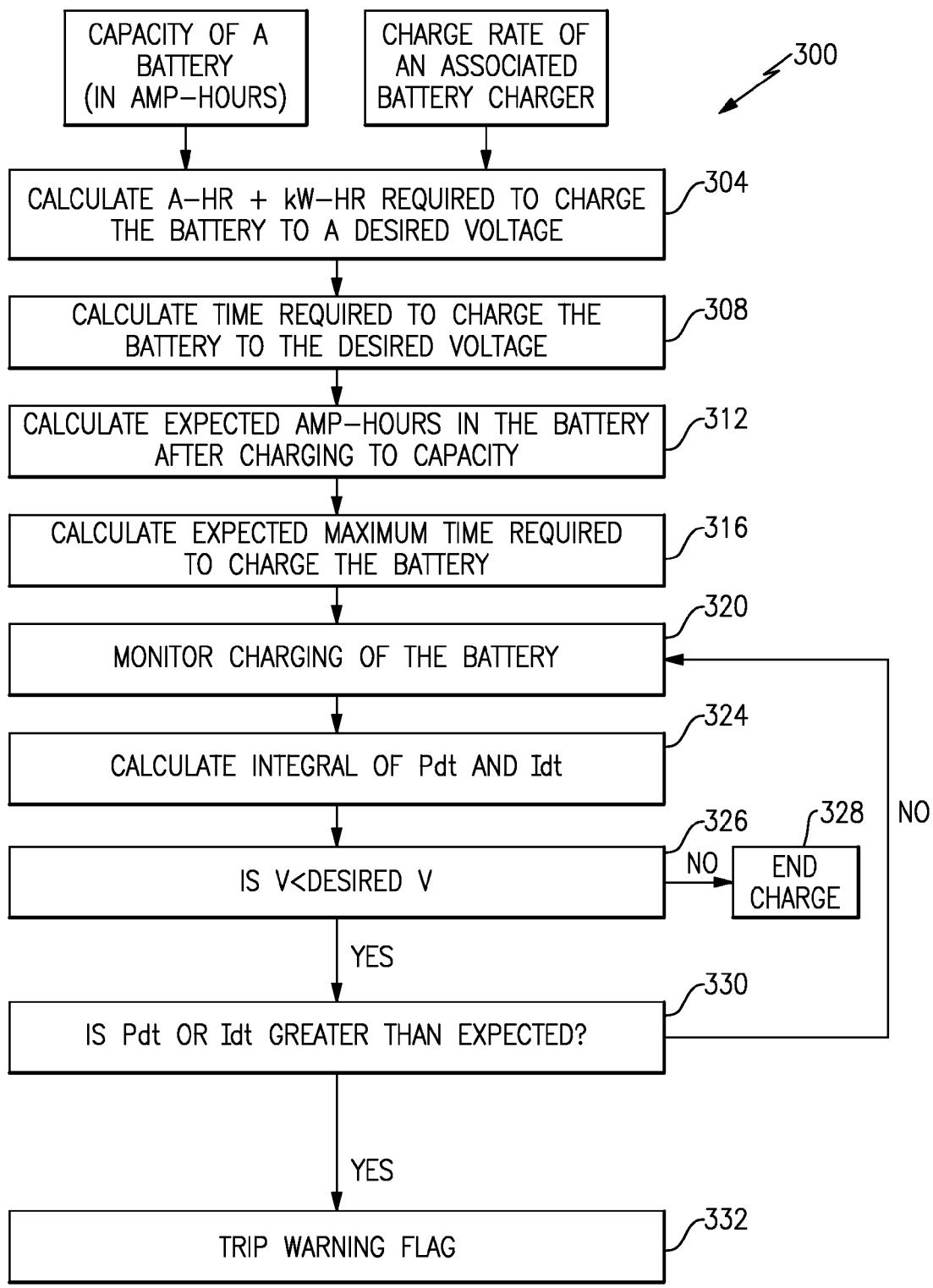
FIG. 4 shows another example battery charge monitoring method.

Referring now to FIG. 4, another example battery charge monitoring method 300 identifies discrepancies between actual A-hrs and expected A-hrs used to charge the battery 24 to a desired voltage. The method 300 also identifies discrepancies between actual time and expected time used to charge the battery 24 to the desired voltage.

In the method 300, a calculation at a step 304 utilizes the capacity of the battery 24 and the charge rate associated with the battery charger 104 to determine the expected capacity of the battery when charging the battery 24 to a desired level. At a step 308, the method 300 calculates the expected time required to charge the battery 24 to the desired voltage.

The capacity of the battery 24 in the example method 300 is a maximum total capacity that the battery 24 is capable of storing. The capacity may be based on design specifications for the vehicle 12 (FIG. 1). In another example, the capacity of the battery may be a desired percentage of the maximum total capacity that the battery 24 is capable of storing. For example, it may be desirable to charge the battery to sixty percent of its maximum total capacity. In such an example, the battery capacity for the method 300 would be sixty percent of the total maximum capacity of the battery 24.

Next, at a step 312, the method 300 recognizes that the battery 24 may already have a partial charge and then calculates the expected total capacity that the battery will contain after charging the battery 24 to its capacity. The method 300 realizes that there may be some energy lost during charging, limitations in sensor capabilities, etc. and adds an incremental capacity to the expected charge capacity. The method 300 begins charging the battery at a step 316.

The method 300 calculates integrals of Pdt (kW-hr) and Idt (A-hrs) at a step 324. In this example, these calculations are running calculations that update in real-time during the charging. The voltage rise on the cells 120 (or open circuit voltage) of the battery 24 is a function of the integral of Pdt and Idt. The method 300, at a step 326 determines if the voltage is greater than or equal to a desired voltage. If so, the method ends the charge at a step 328.

At a step 330, an actual kW-hr and an actual A-hrs from the step 324 are compared real time to the expected charge rate values from the steps 312 and 316. If one of the actual values is greater than the expected values, the method 300 trips a warning flag at a step 332. If neither of the actual values is greater than the expected values, the method 300 takes no action and the battery charger 104 continues to monitor charging of the battery 24.

The warning flag at the step 338 may take many forms. The warning flag could, for example, be an internal alert that notifies a technician of a discrepancy between an expected Pdt and Idt and an actual Pdt and Idt.

If, during successive charges, the method 300 continues trip the warning flag, the method may initiate another type of warning, such as a visual warning that is visible to the driver. For example, if the battery is charged ten times and each of those charges results in the warning flag, the method 300 may initiate the visual warning.

Figure 5:
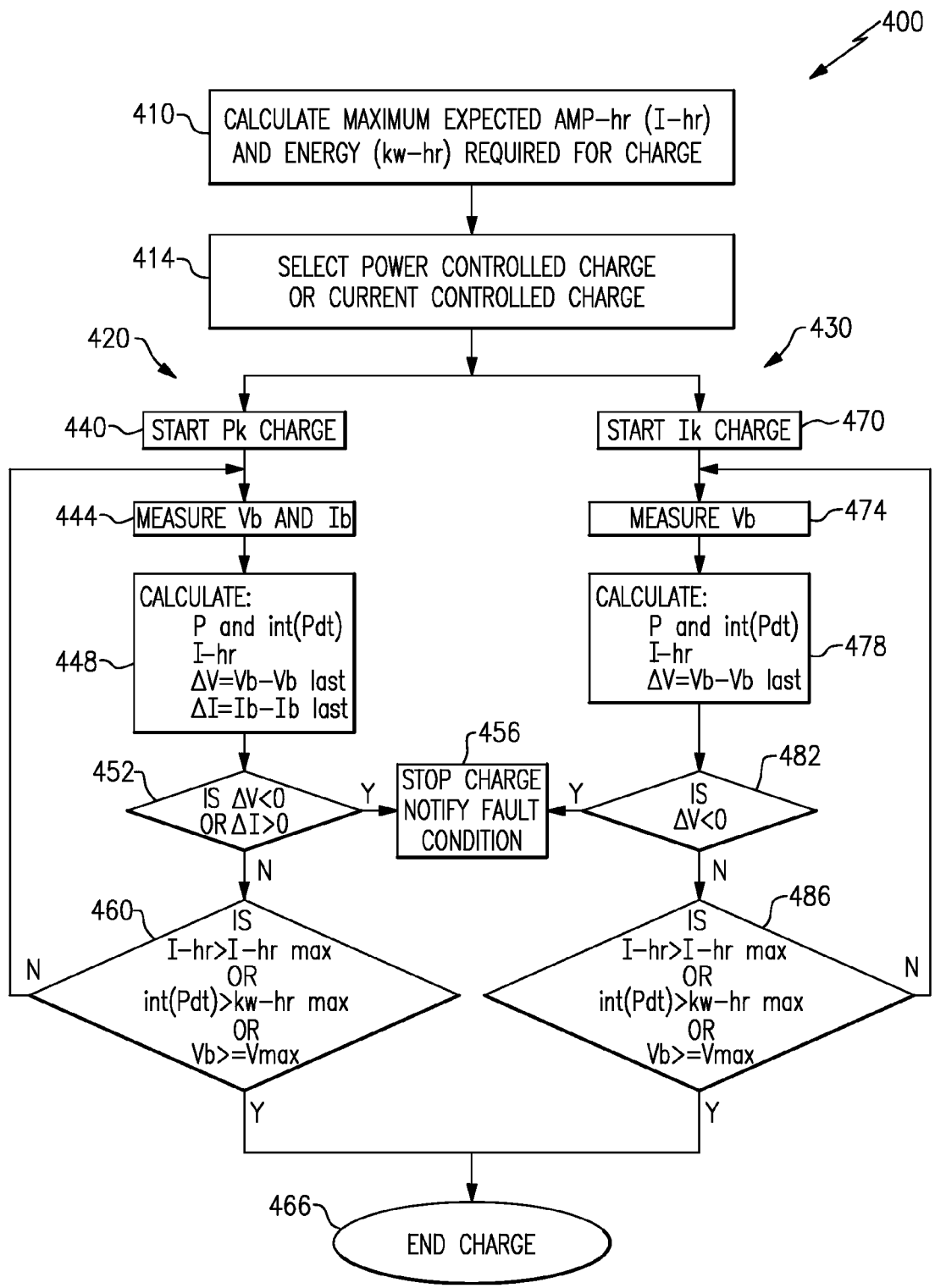
FIG. 5 shows yet another example battery charge monitoring method.

Referring now to FIG. 5, another example battery charge monitoring method 400 is used to charge a battery (or cells of the battery). Depending on the information discovered during the monitoring, the method 400 may notify a user of a fault condition associated with the battery when ending the charge. Alternatively, the method 400 may simply end the charge (without identifying any fault condition).

In this example, the method 400, at a step 410, calculates the expected amp-hours (I-hr max) and energy (in kW-hrs) that are required to charge the battery. Factors that may be used to calculate these expected values include the battery's state-of-charge, capacity, temperature, age, maximum voltage, resistance, etc. Another factor may be a particular charge strategy for the battery.

The battery (and cells of the battery) typically have a known input resistance R. If the input resistance is not known, a person having skill in this art and the benefit of this disclosure would be able to determine the resistance R.

After calculating the expected values at the step 410, the method 400 proceeds down a first path 420 or a second path 430. The first path 420 is utilizes constant power charging (Pk) to charge the battery. The alternative second path 430 utilizes constant current charging (Ik) to charge the battery. A step 414 represents this selection. A user may make the selection at step 414 in some examples.

Referring to the first path 420, the charge starts at a step 440. The actual battery voltage (Vb) and actual battery current (Ib) are then monitored at a step 444 during the charge. With these actual values, the method 400 calculates actual power (P), actual energy (int(Pdt)), Amp-hr (int(Idt)), delta V, and delta I at a step 448. As may be appreciated, energy (kW-hr) can be represented as int(V*Idt), and Amp-hr as int(Idt).

In this example, the increasing charge of the battery causes its voltage to increase monotonically, such that delta V is non-negative. Since a relatively constant power charge is utilized, and, because P=V*I, the voltage increasing monotonically indicates that the current during the charge decreases monotonically, such that delta I is less than or equal to zero.

Fluctuations from a substantially monotonic increase of the voltage, a substantially monotonic decrease of the current, or both are then detected at a step 452. During the charging, if the actual voltage is decreasing or the actual current is increasing, there is an assumed error associated with the battery. The charge is then stopped, and an operator is notified of a fault condition at a step 456.

If there are no such fluctuations, the method 400 proceeds to a step 460. At the step 460, if the actual battery voltage is greater than or equal to an expected voltage max, the charge is stopped at a step 466. Also, at the step 460, if the actual A-hr is greater than A-hr max similar to FIG. 4 step 316, the charge is stopped at the step 466. Further, at the step 460, if the energy to the battery (kW-hr–$I^2R$ loss) is greater than an estimated energy value required by the battery, the method 400 stops the charge at the step 466.

Referring to the current controlled charge-based second path 430, the charge starts at a step 470. The actual battery voltage is then monitored at a step 474. Ib is known, as the second path 430 represents current controlled charge. With the monitored value from the step 474, the method 400 calculates power (P), energy (int(Pdt)), A-hr (int(Idt)), and delta V at a step 478.

Since the example battery is charged at a relatively constant current, the voltage should always be increasing. If delta V is less than zero, which is detected at a step 482, the method 400 assumes there is some error associated with the battery. The charge is then stopped, at the step 456, and an operator is notified of a fault condition.

If delta V is greater than or equal to zero, the method 400 proceeds to a step 486. At the step 486, the method 400 determines if the voltage used for the charge is greater than or equal to an expected voltage max. If so, the charge ends at the step 466. Also, at the step 486, if the actual A-hr is greater than an expected A-hr, or if the energy to the battery (kW-hr–$I^2R$ loss) is greater than an estimated energy value required by the battery, the method 400 ends the charge at the step 466.

In the some examples of this disclosure, charging may be automatically terminated in response to comparisons of actual measured data to expected (or calculated) data. In one more-specific example, actual Amp-hours required to charge exceeding calculated Amp-hours required to charge automatically terminates the charging. In another example, actual energy delivered to the cell exceeding calculated energy needed automatically terminates the charging. In other example, the charging is terminated if delta V of the battery is less than zero for power controlled or current controlled charges. In yet another example, the charging is terminated if delta I of the battery is positive for power controlled charges. Charging may also be terminated if the voltage of the battery is greater than a calculated maximum voltage for the battery.

A feature of this disclosure is real time monitoring of the battery for faults, plus determining a natural end of charge that may be based on maximum voltages, amp-hour maximums, and kilowatt-hour maximums.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments. Further, unless otherwise specified, the steps may be performed in any order.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A battery charge monitoring method, comprising:
    calculating expected charge data for charging of a vehicle battery using at least a capacity of the vehicle battery, a charge rate, and an expected charge time;
    during the charging, using a controller to compare actual charge data to the expected charge data to identify at least one difference between an actual charge time and the expected charge time, and at least one difference between an actual amount of energy used to charge the vehicle battery and an expected amount of energy required to charge the battery; and
    ending the charging in response to the actual amount of energy to charge the vehicle battery exceeding the expected amount of energy required to charge the vehicle battery.

2. The battery charge monitoring method of claim 1, further comprising ending the charging in response to the expected charge time exceeding the actual charge time.

3. The battery charge monitoring method of claim 1, wherein the expected charge data and the actual charge data comprise electric charge data, and charging of the vehicle battery is terminated in response to an actual amount of electrical charge exceeding an expected amount of electrical charge.

4. The battery charge monitoring method of claim 1, wherein the expected charge data and the actual charge data comprise voltage data, and charging of the vehicle battery is terminated in response to an actual voltage exceeding an expected amount of voltage.

5. The battery charge monitoring method of claim 1, wherein the expected charge data comprises a substantially monotonic increase of the voltage such that a change in the voltage during the charging is substantially non-negative, and charging is terminated if the change in the voltage is negative.

6. The battery charge monitoring method of claim 1, wherein the expected charge data comprises a substantially monotonic decreasing battery current such that a change in the vehicle battery current during the charging is less than or equal to zero, and charging is terminated if the change in the current is greater than zero.

7. The battery charge monitoring method of claim 1, wherein the capacity of the vehicle battery comprises a maximum voltage for cells of the vehicle battery.

8. The battery charge monitoring method of claim 1, wherein the capacity of the vehicle battery comprises a percentage of a maximum voltage for cells of the vehicle battery.

9. The battery charge monitoring method of claim 1, wherein the capacity of the vehicle battery comprises an amp-hour capacity for cells of the vehicle battery.

10. The battery charge monitoring method of claim 1, further comprising using a battery charge controller for the calculating and the comparing.

11. The battery charge monitoring method of claim 1, wherein the calculating is prior to the charging.

12. The battery charge monitoring method of claim 1, wherein the vehicle battery is a traction battery, and further comprising powering an electric machine with power from the traction battery to generate torque to drive at least one set of vehicle drive wheels.

13. The battery charge monitoring method of claim 1, further comprising calculating using the controller and charging using a battery charger, the controller separate and distinct from the battery charger.

14. The battery charge monitoring method of claim 1, further comprising charging the battery using a constant power level in response to a first input from a user and charging the battery using a constant current level in response to a different, second input from the user.

15. A battery charging system, comprising:
a battery charger to charge a vehicle battery; and
a controller configured to selectively end a charge of the vehicle battery in response to an actual charge amount exceeding an expected charge amount, the expected charge amount calculated using at least a capacity of the vehicle battery and a charge rate, the expected charge amount including an expected amount of electrical charge used to charge the vehicle battery.

16. A battery charge monitoring method, comprising:
Comparing, using a controller, an actual charge time for a charge of a vehicle battery to an expected charge time for the charge of the vehicle battery;
comparing an actual amount of charge used to charge the vehicle battery to an expected amount of charge used to charge the vehicle battery;
ending the charge for the vehicle battery in response to a difference between the actual charge time and the expected charge time; and
ending the charge of the vehicle battery in response to a difference between the actual amount of charge and the expected amount of charge.

17. The method of claim 16, further comprising ending the charge of the vehicle battery in response to the actual charge time exceeding the expected charge time.

* * * * *